United States Patent [19]
Ibing

[11] 3,797,733
[45] Mar. 19, 1974

[54] SHOPPING BAG OF PLASTIC FOIL

[75] Inventor: Werner Ibing, Vejen, Denmark

[73] Assignee: A/S Rolles Fabriken, Vejen, Denmark

[22] Filed: Dec. 6, 1971

[21] Appl. No.: 204,923

[30] Foreign Application Priority Data
Sept. 24, 1970 Denmark............................ 4889/70

[52] U.S. Cl..................................... 229/55, 229/49
[51] Int. Cl............................................. B65d 33/02
[58] Field of Search......... 229/55, 49, 37 E, DIG. 2, 229/DIG. 4

[56] References Cited
UNITED STATES PATENTS
3,506,185   4/1970   Christensen .......................... 229/55
2,233,906   3/1941   Zalkind ................................ 229/49

Primary Examiner—Herbert F. Ross
Assistant Examiner—Stephen P. Garbe
Attorney, Agent, or Firm—Cushman, Darby & Cushman

[57] ABSTRACT

A shopping bag of plastic foil which in flattened condition is substantially rectangular having a rectilinear mouth at which hand grip means are provided. Spaced from the mouth edge and parallel with said edge one or more reinforcing lists are mounted to the bag side. Each of the lists consists of a strip having a profiled cross-section with a total thickness which is several times larger than the wall thickness of the strip.

3 Claims, 3 Drawing Figures

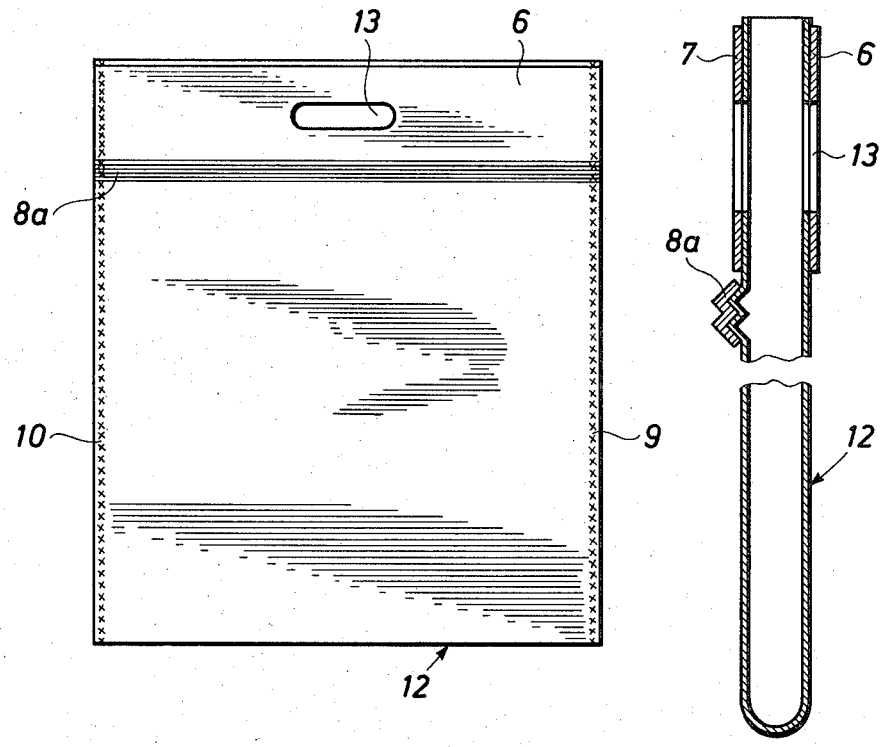
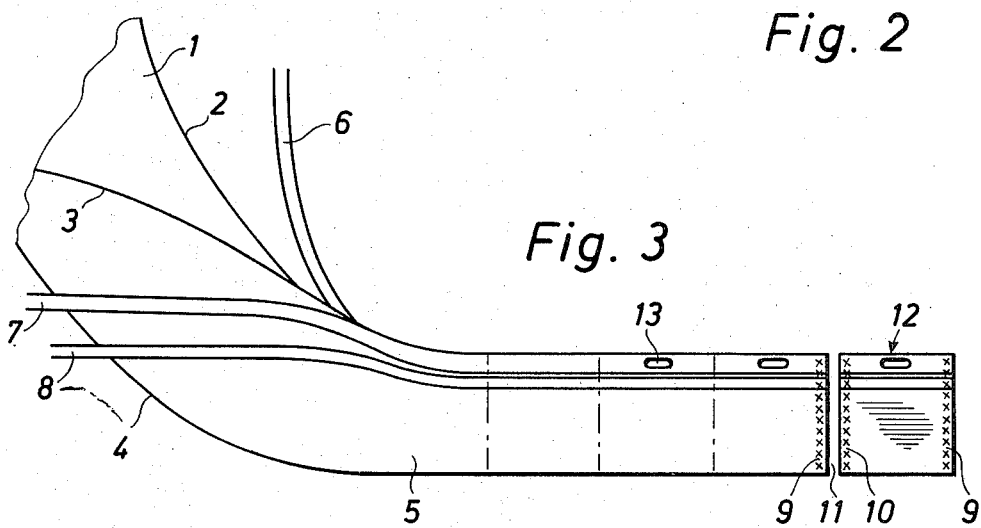

SHOPPING BAG OF PLASTIC FOIL

The invention relates to a shopping bag of plastic foil with a mouth that is substantially rectilinear in the flattened condition of the bag and along which there is provided at least one reinforcing list substantially parallel with the edge of the mouth.

A shopping bag of plastic foil is provided with such a reinforcing list, partly to distribute the stresses to which the plastic material is subjected when the loaded bag is carried by a handle usually consisting of a slot in the rim portion near the mouth, partly to provide the upper parts of the walls of the bag with such rigidity as to facilitate loading of goods into the bag and their removal therefrom simultaneously with advertisements printed on the sides of the bag remaining fully visible, even though the bag is not filled to the mouth edges, and finally to ensure an easier comprehensive view of the contents of the bag from above when the two edges of the mouth are pulled away from each other.

The reinforcing list may consist of a comparatively thick strip of plastic or cardboard, but although such a list may have a rather great rigidity in one direction, it will be comparatively bendable in a direction at right angles thereto since for practical reasons it will be impossible to use a strip of very great thickness. The result is therefore that such reinforcing lists are liable to become twisted so that the effects aimed at are only partly obtained.

An essential feature of the shopping bag according to the invention is that the reinforcing list consists of a strip with a profiled cross-section having a total thickness which is several times larger than the wall thickness of the strip.

Such a list may consist of comparatively thin material which owing to the shape of the cross-section may provide a very substantial rigidity in all directions and therefore great torsional strength. As a result, it will be possible in practice by means of a comparatively thin strip, for example of plastic material, to provide a rigidity substantially greater than that obtainable by means of a flat list of corresponding thickness, and the manufacture of the list and its arrangement on the bag may be made practically without increasing the cost of the bag.

In a suitable embodiment of the reinforcing list according to the invention it may be of W-formed cross section since this can be produced rather easily by a continuous rolling operation and simultaneously will afford substantial rigidity.

The reinforcing list may appropriately be a plastic strip glued to the wall of the bag so as to make the said wall conform to the cross-section of the list.

The invention is also concerned with a method of manufacturing a shopping bag of the aforesaid kind in which a bag tube, open in one side, is passed in a manner known per se through a welding and cutting station where the said bag tube is provided with welded, transverse seams and cut into individual bags. An essential feature of the method according to the invention is that a flat plastic strip is advanced with the bag tube towards the welding station, an adhesive substance being then applied to the said bag tube and/or the strip, which are thus joined and passed through deforming means such as sectional rollers and folded along longitudinal folding lines to form a list of a section substantially thicker than that of the flat strip.

With the use of this method bags may be manufactured in a continuous operation without delaying same and practically without appreciably increasing the cost of the bags since the novel method requires only a few simple means for advancing and arranging the plastic strip and giving it the desired profile, and the cost of the plastic strip itself is very low.

Compared with the known shopping bags of plastic foil with reinforcing lists a bag according to the invention, made at substantially the same rate of production and at the same cost of manufacture, possesses a substantially greater rigidity in the area of the bag mouth with the consequent and aforesaid advantages.

The invention will now be further described with reference to the drawing, in which FIG. 1 is a top view of a bag in its flat condition, FIG. 2 is a section through the bag on an enlarged and partially distorted scale, FIG. 3 is a diagrammatic representation of the method of manufacturing such bags.

The shopping bag disclosed is of the kind having outside reinforcing strips glued to the bag along the edge of its mouth and with a finger grip opening punched in the said strips and the edge portions of the bag walls, but the invention is also applicable to bags of a different design.

As will appear from FIG. 3, a plastic foil 1 is advanced through a bag manufacturing machine and laid together along the two edges 2 and 3 of the foil, thereby forming an opposite fold 4. As a result, there is obtained a flat tube bag 5 which is open in one side.

Along the united edges 2 and 3 of the bag tube produced are provided reinforcing strips 6 and 7 of a plastic foil which is somewhat thicker than the foil 1, and glue is applied to these strips or the corresponding edge portion of the bag tube, after which the reinforcing strips are glued to the two bag walls.

Further, there is a third plastic strip 8 which is likewise glued to the flat bag tube 5 beneath the reinforcing strips 6, 7. The bag tube thus prepared is passed through deforming means, preferably sectional rollers, which are adapted to fold the strip 8 to form a section of a height substantially greater than the original thickness of the strip. In the example illustrated the strip 8 is folded to form a section of W form as indicated in FIG. 2 and since, in fact, the strip has been glued to the wall of the plastic bag, the said wall will be folded correspondingly.

The bag tube is then in usual manner passed through a welding and cutting station where there are produced two parallel welded seams 9 and 10 and a cut 11 located between the said seams so that the bag tube is divided into finished shopping bags 12. At a suitable place the bag tube is in a manner known per se provided with punched finger grip openings 13 which extend through the reinforcing strips 6 and 7 and the corresponding edge portions of the bag tube. The welded seams 9 and 10 comprise both the strips 6, 7 and the sectional list 8a. The fold consequently produced in the bag wall where there is no reinforcing list 8a is without importance in practice, but there is nothing preventing the bag from being provided with a reinforcing list 8a on either bag wall.

I claim:

1. A shopping bag of plastic foil with a mouth that is substantially rectilinear in the flattened condition of the bag and along which there is provided a pair of reinforcing lists, one on either side of and substantially parallel with the edges of the mouth, and an additional reinforcing list is provided substantially parallel to and directly below at least one of said pair of reinforcing lists characterised in that the additional reinforcing list consists of a strip with a profiled cross-section having a total thickness which is several times larger than the wall thickness of the strip.

2. A shopping bag as claimed in claim 1, characterized in that the additional reinforcing list is of W-formed cross-section.

3. A shopping bag as claimed in claim 1 with the additional reinforcing list of plastic material, characterized in that the additional reinforcing list is glued to the wall of the bag so that the said wall conforms to the cross-section of the list.

* * * * *